United States Patent
Furukawa (10) Patent No.: US 8,953,048 B2
(45) Date of Patent: Feb. 10, 2015

(54) INFORMATION PROCESSING APPARATUS AND CONTROL METHOD THEREOF

(75) Inventor: Takeshi Furukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 12/960,384

(22) Filed: Dec. 3, 2010

(65) Prior Publication Data

US 2011/0134252 A1 Jun. 9, 2011

(30) Foreign Application Priority Data

Dec. 8, 2009 (JP) ................................. 2009-278958
Oct. 7, 2010 (JP) ................................. 2010-227549

(51) Int. Cl.

| H04N 17/00 | (2006.01) |
|---|---|
| H04N 17/02 | (2006.01) |
| H04N 5/445 | (2011.01) |
| G09G 5/10 | (2006.01) |
| G09G 5/14 | (2006.01) |
| H04N 21/422 | (2011.01) |
| H04N 21/431 | (2011.01) |
| H04N 21/4402 | (2011.01) |
| H04N 5/58 | (2006.01) |

(52) U.S. Cl.
CPC ............. *H04N 5/44504* (2013.01); *G09G 5/10* (2013.01); *G09G 5/14* (2013.01); *H04N 21/42202* (2013.01); *H04N 21/431* (2013.01); *H04N 21/440263* (2013.01); *H04N 5/58* (2013.01); *G09G 2340/0407* (2013.01); *G09G 2340/0464* (2013.01); *G09G 2360/144* (2013.01)
USPC ........... 348/177; 348/178; 348/179; 348/180; 348/181; 348/182; 348/184; 348/191; 348/68; 348/131; 348/222.1; 348/278; 348/333.01; 348/370; 348/511; 348/563; 348/564; 348/569; 348/584; 348/586; 348/589; 348/598; 348/723; 348/747; 348/749; 348/751; 348/761; 348/766; 348/790; 345/60; 345/76; 345/82; 345/87; 345/98; 345/104; 345/603; 345/629; 345/638; 715/798

(58) Field of Classification Search
USPC ......... 348/177, 178, 179, 180, 181, 182, 184, 348/602, 191, 511, 747, 589, 600, 751, 723, 348/68, 131, 222.1, 278, 333.01, 370, 563, 348/564, 569, 584, 586, 598, 749, 761, 766, 348/790; 345/204, 207, 638, 698, 60, 76, 345/81, 82, 87, 98, 100, 104, 603, 629; 715/798
See application file for complete search history.

(56) References Cited

U.S. PATENT DOCUMENTS 5,751,283 A * 5/1998 Smith ............................ 715/798
6,654,035 B1 * 11/2003 DeStefano .................... 715/798

(Continued)

FOREIGN PATENT DOCUMENTS

| JP | 6-308892 A | 11/1994 |
| JP | H11065810 A | 3/1999 |

(Continued)

*Primary Examiner* — Jefferey Harold
*Assistant Examiner* — Mustafizur Rahman
(74) *Attorney, Agent, or Firm* — Canon USA, Inc. IP Division (57) ABSTRACT

The present invention ensures the visibility of a character or a drawing displayed on a screen. The illuminance of one or more partial areas forming a display unit is measured, and a video display position is set to an area except for the partial area where the illuminance is a reference value or more.

14 Claims, 11 Drawing Sheets

(56) References Cited

U.S. PATENT DOCUMENTS

| | | | |
|---|---|---|---|
| 6,657,637 B1* | 12/2003 | Inagaki et al. | 345/629 |
| 7,206,029 B2* | 4/2007 | Cohen-Solal | 348/565 |
| 7,631,974 B2* | 12/2009 | Mukai | 353/85 |
| 8,400,547 B2* | 3/2013 | Akita et al. | 348/333.01 |
| 2003/0214586 A1* | 11/2003 | Lee et al. | 348/180 |
| 2003/0231161 A1* | 12/2003 | Yamaguchi | 345/102 |
| 2005/0200912 A1* | 9/2005 | Yamakado et al. | 358/450 |
| 2005/0259112 A1* | 11/2005 | Suzukawa et al. | 345/603 |
| 2006/0197851 A1* | 9/2006 | Vlahos | 348/239 |
| 2006/0265592 A1* | 11/2006 | Tsuchida et al. | 713/176 |
| 2007/0285379 A1* | 12/2007 | Jung et al. | 345/102 |
| 2008/0111922 A1* | 5/2008 | Ferri et al. | 348/564 |
| 2009/0141180 A1* | 6/2009 | Kondo et al. | 348/723 |
| 2009/0256974 A1* | 10/2009 | Mukai | 348/751 |
| 2009/0273661 A1* | 11/2009 | Mauchly | 348/14.08 |
| 2009/0289951 A1* | 11/2009 | Matsuda | 345/589 |
| 2012/0062621 A1* | 3/2012 | Miyahara et al. | 345/690 |

FOREIGN PATENT DOCUMENTS

| | | |
|---|---|---|
| JP | 2002215136 A | 7/2002 |
| JP | 2007-183449 A | 7/2007 |
| JP | 2008022115 A | 1/2008 |
| JP | 2008233379 A | 10/2008 |
| JP | 2009-049512 A | 3/2009 |
| JP | 2009181501 A | 8/2009 |
| JP | 2011-013515 A | 1/2011 |

* cited by examiner

INFORMATION PROCESSING APPARATUS AND CONTROL METHOD THEREOF

BACKGROUND OF THE INVENTION

1. Field of the Invention

The present invention relates to a technology that determines a video display position on a screen (display).

2. Description of the Related Art

Recently, a technology has become widespread which changes luminance, color temperature, and color shading depending on a surrounding environment to provide a easily viewable video image on an LCD (liquid crystal display) or a PDP (plasma display panel). In particular, Japanese Patent Application Laid-Open No. 6-308892 discusses a well-known technology for changing luminance on a screen depending on the intensity of ambient light around the screen to easily view a character or a drawing displayed on the screen.

However, when strong light such as sunlight directly enters the screen, the visibility of a character or a drawing displayed on the screen cannot be sufficiently improved by changing the luminance of the screen. When strong light enters a part of the screen, a user performs operation for moving the character or drawing to another area on the screen where strong light does not enter to easily view the character or drawing displayed on a part of the screen.

SUMMARY OF THE INVENTION

The present invention is directed to ensure the visibility of a character or a drawing displayed on a part of a screen.

According to an aspect of the present invention, an information processing apparatus that sets a position of a video image displayed on a display unit includes: a measurement unit configured to measure illuminance of one or more partial areas forming the display unit; and a setting unit configured to set the video display position to an area except for a partial area where the illuminance is a reference value or more.

According to the present invention, the following advantages are obtained. When strong light enters a part of a screen, a user can easily view a character or a drawing displayed on a part of the screen without performing operation for moving the character or drawing to another area on the screen where strong light does not enter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
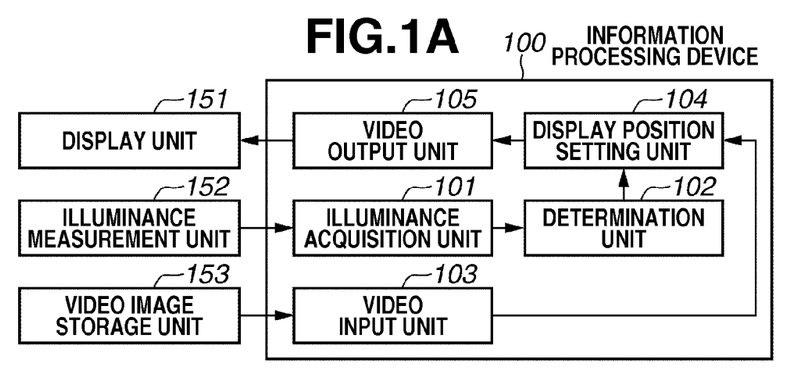
FIGS. 1A to 1C illustrate functional block diagrams of an example of a functional configuration of an information processing apparatus.

FIG. 1A illustrates a functional block diagram of a functional configuration of an information processing apparatus 100 according to a first exemplary embodiment. The information processing apparatus 100 is communicably connected to a display unit 151, an illuminance measurement unit 152, and a video image storage unit 153 via cables. The information processing apparatus 100 includes an illuminance acquisition unit 101, a determination unit 102, a video input unit 103, a display position setting unit 104, and a video output unit 105.

The display unit 151 is a liquid crystal display (LCD) or a plasma display panel (PDP), and displays a video image corresponding to a video signal output from the video output unit 105. The display unit 151 may be a projection area of a projection device such as a liquid crystal on silicon (LCOS) projector. The illuminance measurement unit 152 is a well-known illuminometer, and measures the illuminance of one of a plurality of partial areas obtained by dividing a display area of the display unit 151. The illuminance measurement unit 152 may include illuminometers disposed at a constant interval within a display area of the display unit 151. The illuminance measurement unit 152 may be an illuminometer that measures the luminance of the partial area of the display unit 151.

Figure 2A:
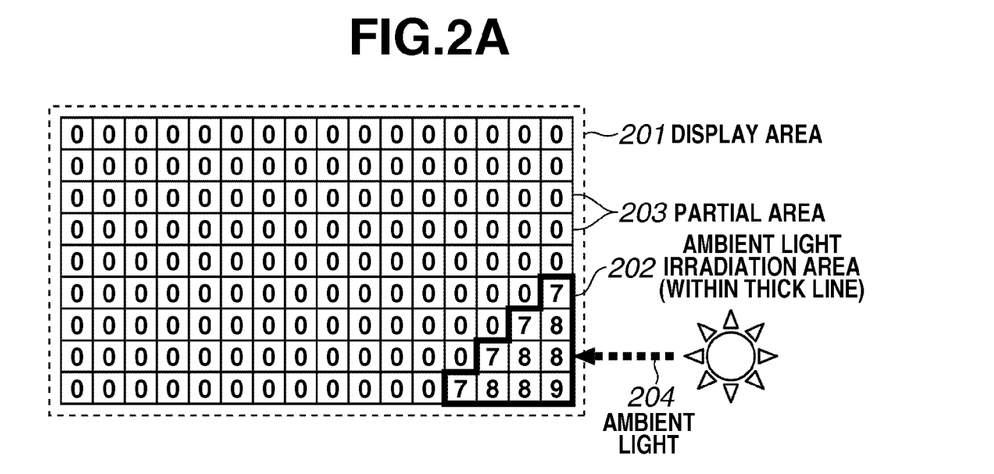
FIGS. 2A to 2C schematically illustrate processing for changing a video display position based on a measured illuminance value.
Figure 2B:
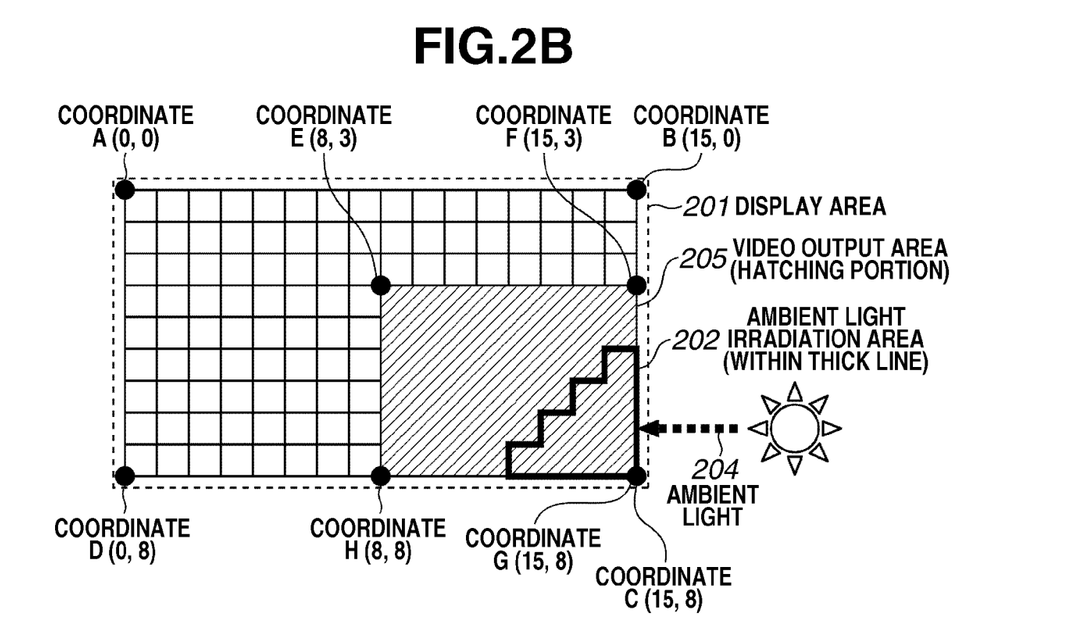
Figure 2C:
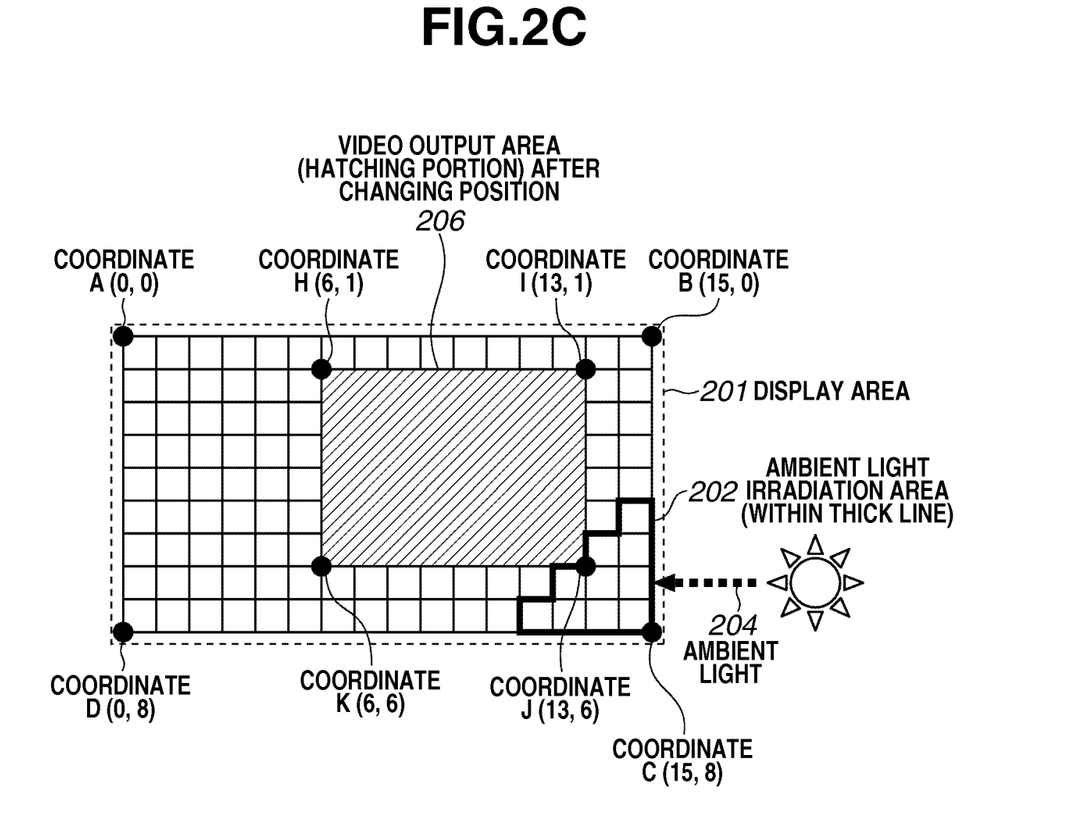

FIGS. 2A to 2C schematically illustrate processing for measuring the illuminance of the partial area by the illuminance measurement unit 152. According to the present exemplary embodiment, as illustrated in FIG. 2A, 144 areas obtained by dividing the display area of the display unit 151 into 16 (in wide)×9 (in height) areas are used for measuring the illuminance. Referring to FIG. 2A, a numerical value described in the partial area is obtained by quantizing the illuminance (hereinbelow, referred to as an illuminance value) measured by the illuminance measurement unit 152. Referring to FIG. 2A, an area (ambient light irradiation area 202) corresponding to a part of a display area 201 is irradiated with ambient light 204, and the illuminance value of the ambient light irradiation area 202 is higher than an illuminance value of another area. More specifically, a high illuminance value indicates high illuminance measured by the illuminance measurement unit 152.

The video image storage unit 153 is a server that distributes contents to a hard disk drive (HDD), and stores video data to be output to the display unit 151. The illuminance acquisition unit 101 is an interface (I/F) that obtains the illuminance value. The determination unit 102 is a micro processing unit (MPU) that determines whether the illuminance value of the partial area is a predetermined threshold as a reference value or less. The predetermined threshold is not limited to a constant, and may be calculated from the time change in illuminance. The video input unit 103 is an interface (I/F) that inputs video data output from the video image storage unit 153.

The display position setting unit 104 is a micro processing unit (MPU), and sets the video display position corresponding to the video data input to the video input unit 103 based on the determination result of the determination unit 102. The processing for setting the video display position includes, e.g., processing for changing the coordinate for displaying a video image, and processing for affine transforming a video shape. The processing of the display position setting unit 104 is specifically described later. The video output unit 105 is an interface (I/F) that outputs a video signal for displaying a video image at the position set on the display unit 151 by the display position setting unit 104.

Figure 3:
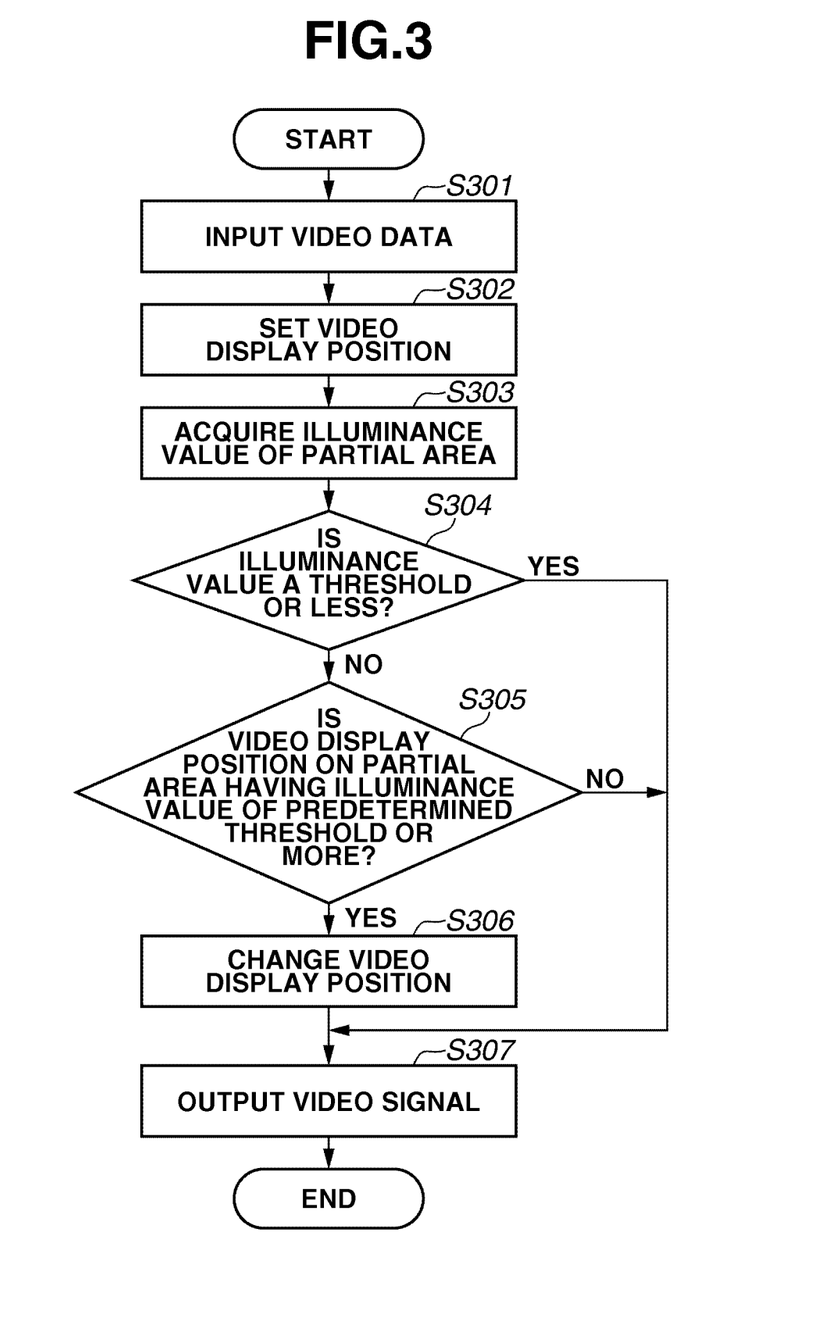
FIG. 3 illustrates a flowchart of an example of processing for setting a video display position.

FIG. 3 illustrates a flowchart of example processing for setting the video display position in the information processing apparatus 100. In step S301, the video input unit 103 inputs video data output by the video image storage unit 153. In step S302, the display position setting unit 104 sets the video display position corresponding to the input video data. In step S303, the illuminance acquisition unit 101 acquires the illuminance value of the partial area acquired by the illuminance measurement unit 152.

In step S304, the determination unit 102 determines whether the illuminance value of the partial area is a predetermined threshold value or less (reference value or less). When the determination unit 102 determines in step S304 that the illuminance value of the partial area is a predetermined threshold value or less (YES in step S304), the determination unit 102 executes the processing in step S305. When the determination unit 102 determines in step S304 that the illuminance value of the partial area is not a predetermined threshold value or less (NO in step S304), the determination unit 102 executes the processing in step S307.

In step S305, the display position setting unit 104 determines whether the video display position corresponding to the video data is located on the partial area in which the illuminance value is a predetermined threshold value or more. When the display position setting unit 104 determines in step S305 that the video display position is located on the partial area in which the illuminance value is a predetermined threshold value or more (YES in step S305), the display position setting unit 104 executes the processing in step S306. On the other hand, when the display position setting unit 104 determines in step S305 that the video display position is not on the partial area on which the illuminance value is a predetermined threshold value or more (NO in step S305), the display position setting unit 104 executes the processing in step S307.

In step S306, the display position setting unit 104 changes the display position so that the video display position is not located on the partial area in which the illuminance value is a predetermined threshold value or more (reference value or more). The processing for changing the display position is specifically described later. In step S307, the video output unit 105 outputs a video signal to the display unit 151. The video signal to be output displays the position set by the display position setting unit 104 in step S302, or the position after it is changed by the display position setting unit 104 in step S305. After executing the processing in step S307, a series of processing ends. The video image storage unit 153 outputs new video data to the video input unit 103, and the processing from step S301 of the new video data is executed again.

Next, the processing in steps S304, S305, and S306 is specifically described with reference to FIGS. 2A to 2C. In step S303, the illuminance value illustrated in FIG. 2A is obtained. More specifically, the illuminance value ranging from 7 to 9 is measured in the ambient light irradiation area 202. In the partial area other than the ambient light irradiation area 202, the illuminance value measures 0. In step S304, the determination unit 102 determines whether the illuminance value of the partial area is a predetermined threshold value (4 according to the present exemplary embodiment) or less. Referring to FIG. 2A, the measured illuminance value is 4 or more is in the ambient light irradiation area 202, and the processing in step 305 is therefore executed.

In step S305, the display position setting unit 104 determines whether the video display position is located on the ambient light irradiation area 202 in which the illuminance value of 4 or more is measured. Hereinbelow, the processing in step S305 is specifically described with reference to FIG. 2B. Apex coordinates of a display area 201 (rectangular area ABCD) as a video displayable area are defined as A(0,0), B(15,0), C(15,8), and D(0,8). In a video output area 205, a video image to which the position is set in step S302 is output. Then, apex coordinates of the video output area 205 (rectangular area EFGH) are E(8,3), F(15,3), G(15,8), and H(8,8). More specifically, in step S305, the display position setting unit 104 determines whether there is a partial area having the illuminance value of 4 or more in the rectangular area EFGH.

The processing executed by the display position setting unit 104 in step S306 is specifically described with reference to FIG. 2C. In the processing executed by the display position setting unit 104, operation is performed to change the coordinate of the video output area 205. According to the present exemplary embodiment, the operation is performed to change the coordinate so that the video output area 205 (video output area 206) after changing the coordinate comes outside the ambient light irradiation area 202 and is positioned at the coordinate that minimizes the amount of movement from the coordinate of the original video output area 205. When an apex (e.g., coordinate G) of the video output area 205 is included in the ambient light irradiation area 202, the operation for changing the coordinate is performed as follows. A condition for setting the video output area 205 (video output area 206) outside the ambient light irradiation area 202 is satisfied and a point (coordinate J) is calculated that minimizes a radius r of a concentric circle with the apex (coordinate G) as center.

When a part of the video output area 205 is the ambient light irradiation area 202 and the apex of the video output area 205 is not included in the ambient light irradiation area 202, the following processing is performed. The apex of the video output area 205 that is the closest to the border of the ambient light irradiation area 202 is moved to the ambient light irradiation area 202, and the processing is performed. When there are a plurality of apexes of the video output area 205 included in the ambient light irradiation area 202, the apex the farthest from the apex of the video output area 205 that is not included in the ambient light irradiation area 202 is set as the center of a concentric circle, the processing is performed. When all the apexes of the video output area 205 are included in the ambient light irradiation area 202, the center of gravity of the video output area 205 is first set as the center of concentric circle, and the processing is executed.

In FIG. 2C, a position of the video output area 206 (rectangular HIJK) is changed to a point moved from the original video output area 205 by −2 in the horizontal direction and −2 in the vertical direction. Thus, the video image can be displayed outside the ambient light irradiation area where the visibility is deteriorated. According to the present exemplary embodiment, the illuminance measurement unit 152 may acquire the illuminance while the display unit 151 are not displaying the video image in order to place the illuminance value measured by the illuminance measurement unit 152 under no influence from light emitted by the display unit 151.

The illuminance measurement unit 152 may acquire the illuminance while the display unit 151 is displaying the video image. As illustrated in FIG. 1C, the information processing apparatus further includes an illuminance correction unit 121, and may input to the determination unit 102 a value obtained by subtracting the illuminance value of the light emitted by the display unit 151 from the illuminance value measured by the illuminance measurement unit 152, as the illuminance value of the ambient light.

Other Embodiments

Figure 4A:
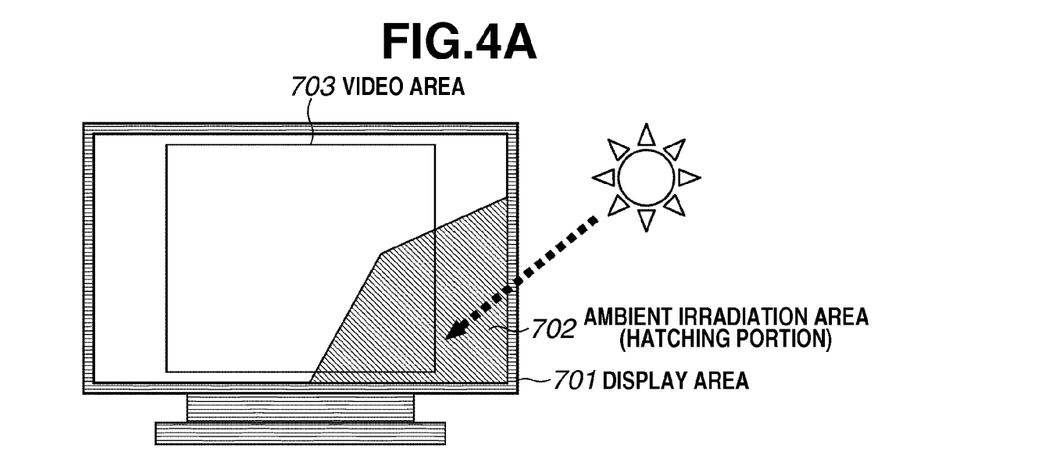
FIGS. 4A to 4C schematically illustrate processing for changing the video display position and the size based on the measured illuminance value.
Figure 4B:
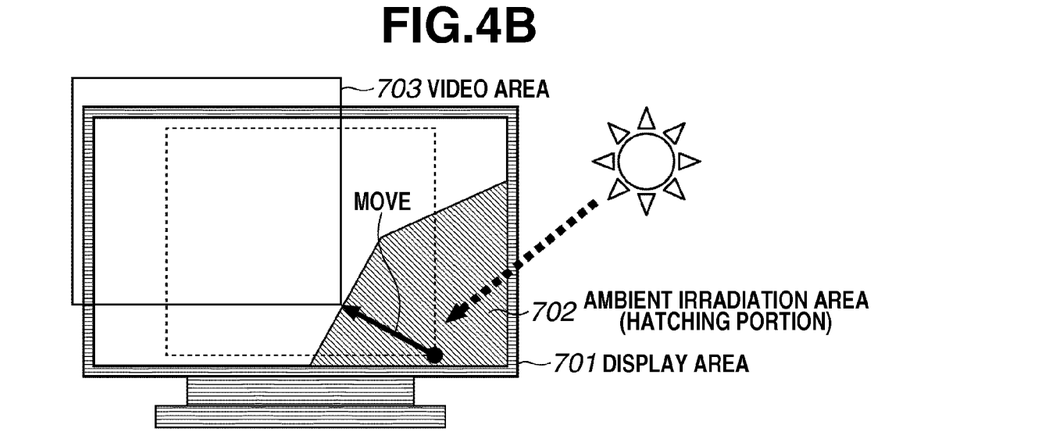
Figure 4C:
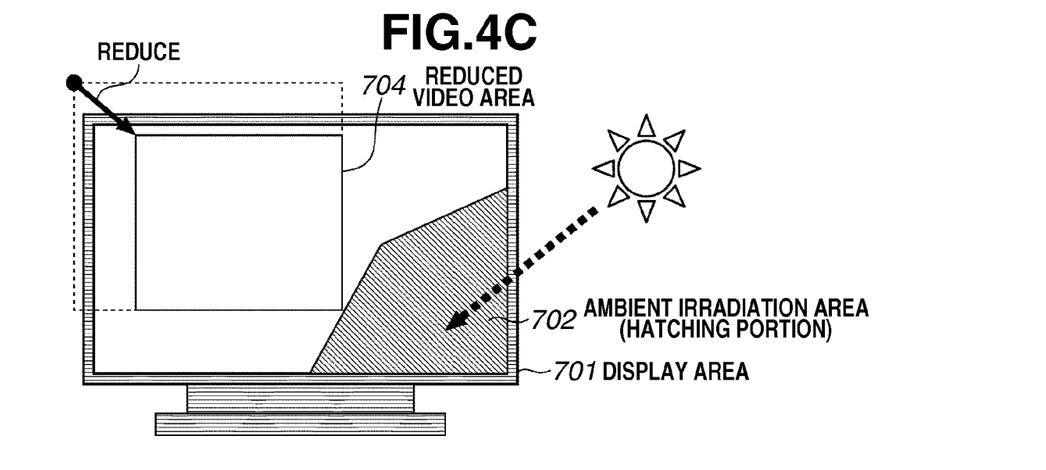

According to the first exemplary embodiment, movement processing for setting the position of the video area outside the ambient light irradiation area is performed. However, by performing the processing, as illustrated in FIG. 4B, a part of a video area 703 is moved to the position outside a display area 701 and a part of the video area 703 cannot be consequently displayed. In this case, as illustrated in FIG. 4C, the change of the size of the video area can be executed to set the entire video area 703 within the display area 701.

Figure 5:
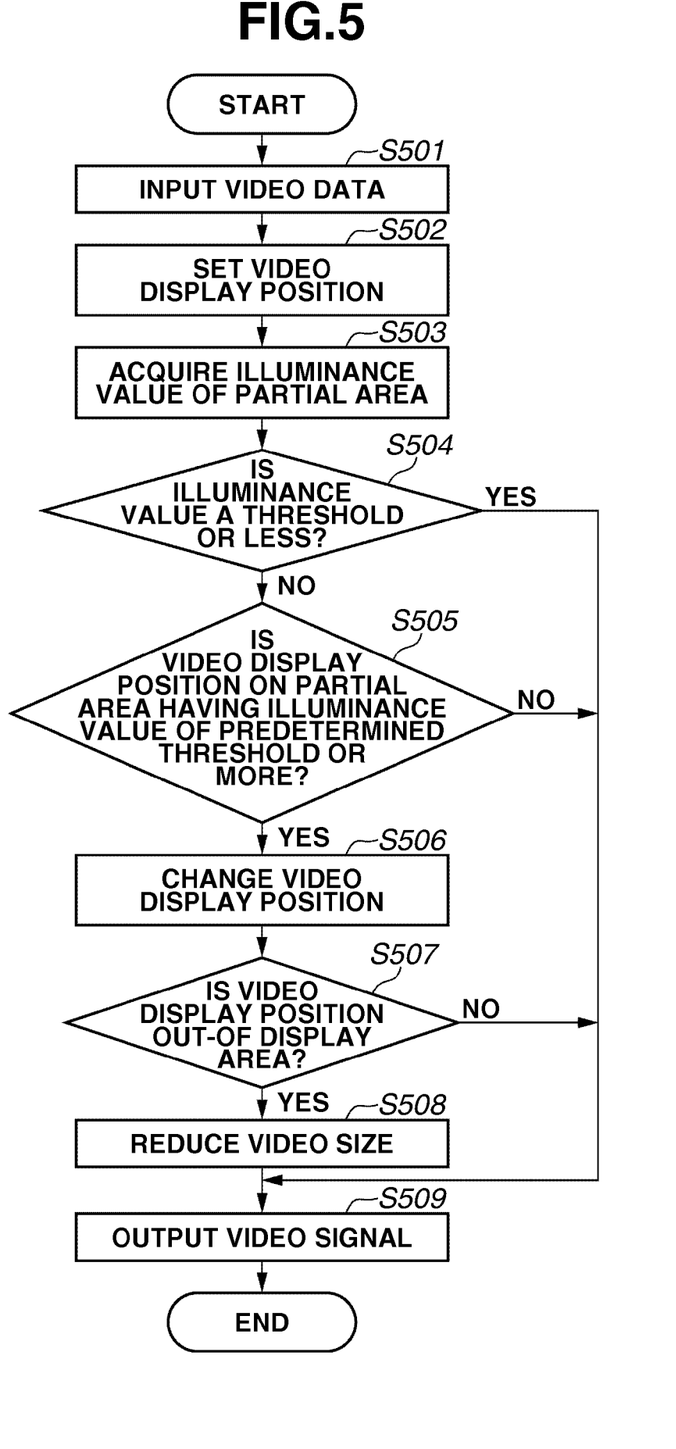
FIG. 5 illustrates a flowchart of example processing for setting the video display position.

FIG. 5 illustrates a flowchart of a processing flow for properly changing the size of the video area in addition to the processing according to the first exemplary embodiment. Referring to FIG. 5, the processing in steps S501 to S506 and the processing in step S509 is similar to the processing in steps S301 to S306 and the processing in step S307 in FIG. 3, a description thereof is therefore omitted, and only different points are described.

In step S507, the display position setting unit 104 determines whether or not the video area after changing the display position is outside the display area. When the display position setting unit 104 determines in step S507 that the video area after changing the display position is outside the display area (YES in step S507), the display position setting unit 104 executes the processing in step S508. On the other hand, when the display position setting unit 104 determines in step S507 that the video area after changing the display position is not outside the display area (NO in step S507), the display position setting unit 104 executes the processing in step S509. In step S508, the display position setting unit 104 changes the size of the video area so that the video area after changing the display position is within the display area. Subsequently, the display position setting unit 104 executes the processing in step S508. Then, the display position setting unit 104 executes the processing in step S509. As a consequence, the video image can be displayed outside the ambient light irradiation area where the visibility is deteriorated, and a desired video image can be displayed within the display area.

According to the first exemplary embodiment, the light emitted by the display unit 151 does not influence the measured illuminance. According to the present exemplary embodiment, processing for measuring the illuminance of the ambient light when the light emitted by the display unit 151 influences the measured illuminance, is described.

Figure 1B:
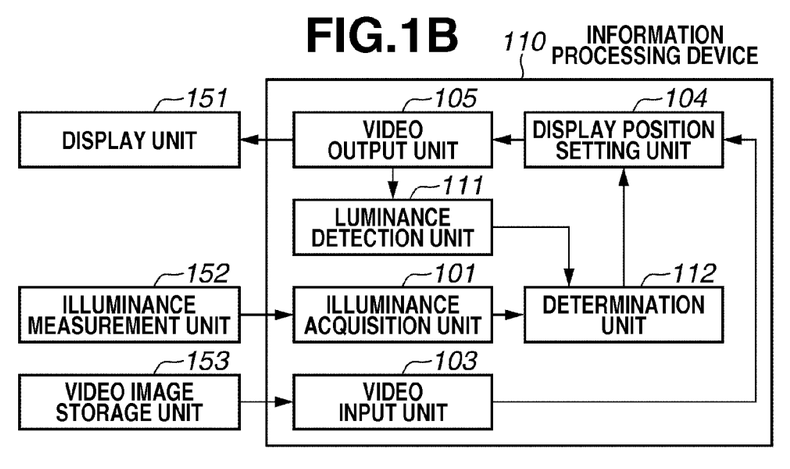
Figure 1C:
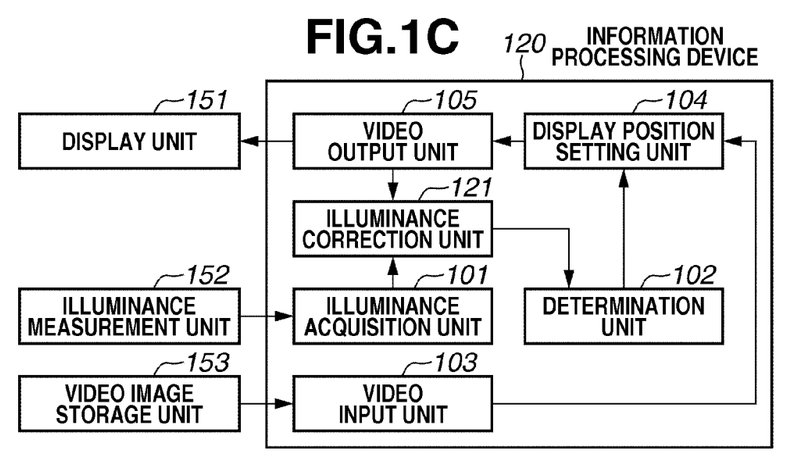

FIG. 1B illustrates a functional block diagram of a functional configuration of the information processing apparatus 110 according to the second exemplary embodiment. The same reference numeral denotes an element with the same function as the information processing apparatus 100, and a description thereof is omitted. A luminance detection unit 111 is a micro processing unit (MPU) and detects the luminance of the light emitted by the display unit 151. According to the present exemplary embodiment, the luminance value (value obtained by quantizing the measured luminance) is calculated from the video signal output to the display unit 151. A determination unit 112 is a micro processing unit (MPU) and when the calculated luminance value is the threshold value or less, determines whether the illuminance value of the partial area is a predetermined threshold value or less. More specifically, when the light emitted by the display unit 151 does not influence the illuminance (e.g., the luminance of scene change is low), the determination unit 112 determines whether the illuminance value of the partial area is a predetermined threshold value or less.

Figure 6:
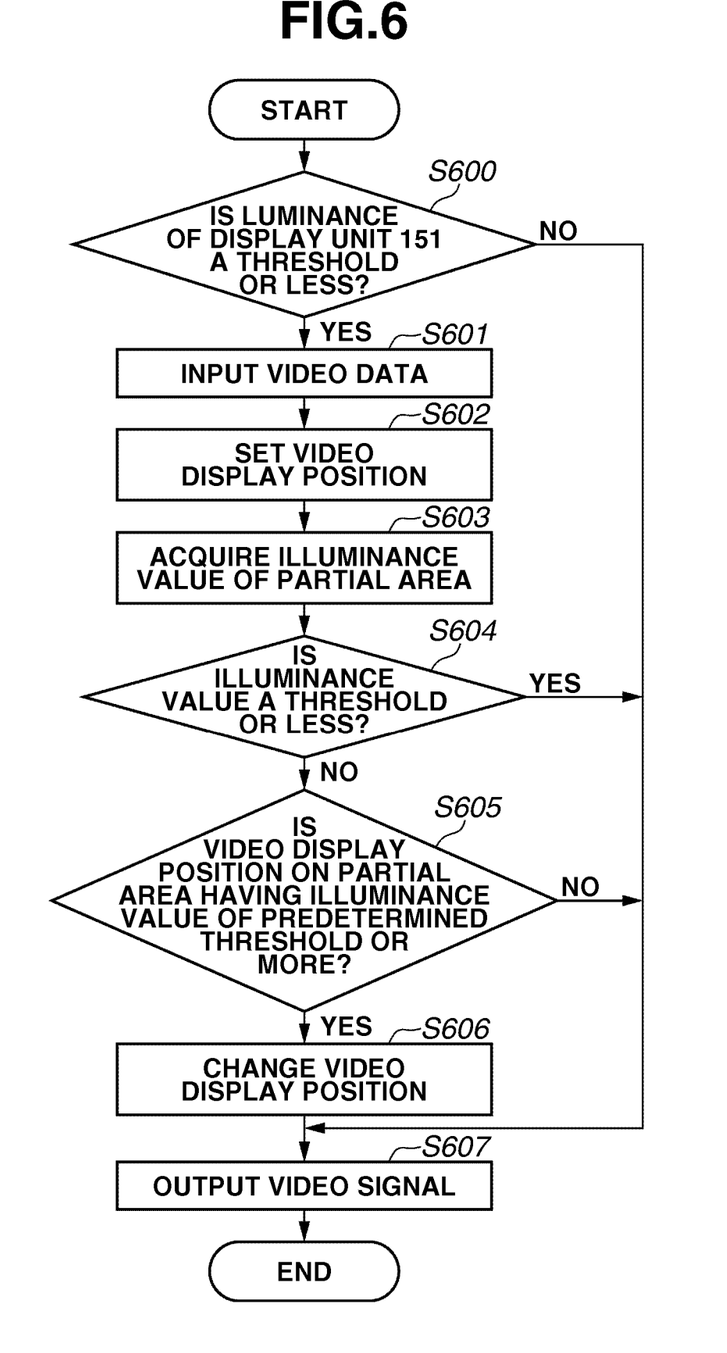
FIG. 6 illustrates a flowchart of an example for setting the video display position.

FIG. 6 illustrates a flowchart of an example of processing for setting the video display position in the information processing apparatus 110. Referring to FIG. 6, the processing in steps S601 to S607 is similar to the processing in steps S301 to S307 in FIG. 3, a description thereof is thus omitted, and only different points are described. In step S600, a luminance detection unit 111 determines whether the luminance value of the display unit 151 is a predetermined threshold value or less. When the luminance detection unit 111 determines in step S600 that the luminance value is a predetermined threshold value or less (YES in step S600), the luminance detection unit 111 executes the processing in step S601. On the other hand, when the luminance detection unit 111 determines in step S600 that the luminance value is not a predetermined threshold value or less (NO in step S600), a series of processing ends. The present processing is sequentially executed at predetermined time interval or predetermined frame interval. The above-described processing is performed, thereby improving the visibility of video content by displaying the video image outside the ambient light irradiation area even if the ambient light irradiation area where the visibility is deteriorated changes with time passage.

According to the first and second exemplary embodiments, depending on the illuminance level of the display unit 151, the area for displaying the video image is changed. According to the present exemplary embodiment, the area for displaying the video image is changed based on the change in illuminance of the display unit 151. Since the information processing apparatus according to the present exemplary embodiment is similar to the information processing apparatus 100, a description thereof is omitted. However, the determination unit 102 determines whether the time change of the illuminance value measured in the partial area is a predetermined threshold value or less. The determination unit 102 stores the illuminance values corresponding to the number of past measurement times, and obtains the difference from the current illuminance value.

According to the third exemplary embodiment, a flowchart illustrating an example of processing for setting the video display position is similar to FIG. 3, and a description thereof is thus omitted. However, in step S304, the determination unit 102 does not determine whether the illuminance value of the partial area is a predetermined threshold value or less, and determines whether a value based on the time change in illuminance value of the partial area is a predetermined threshold value or less.

Figure 7A:
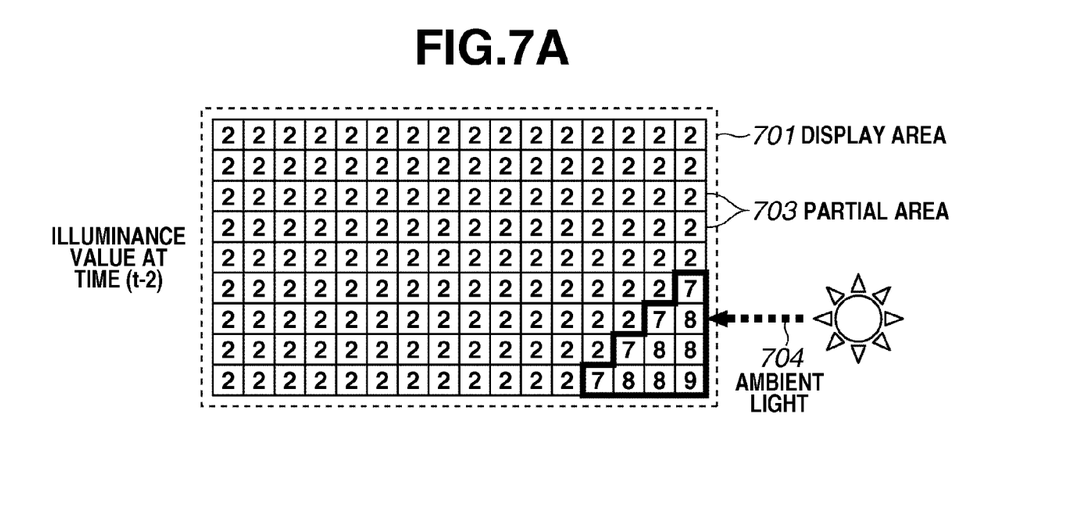
FIGS. 7A to 7D schematically illustrate processing for determining a value based on the time change in illuminance value.
Figure 7B:
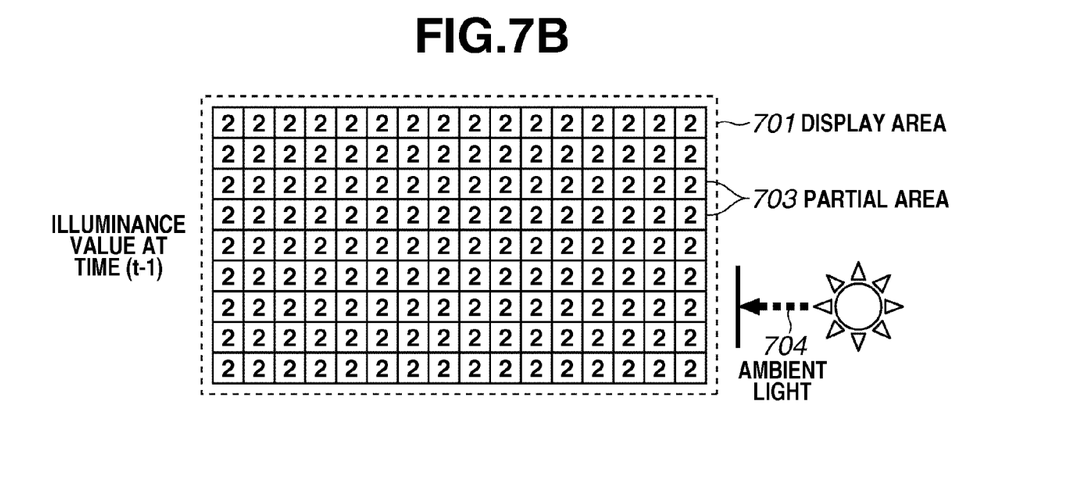
Figure 7C:
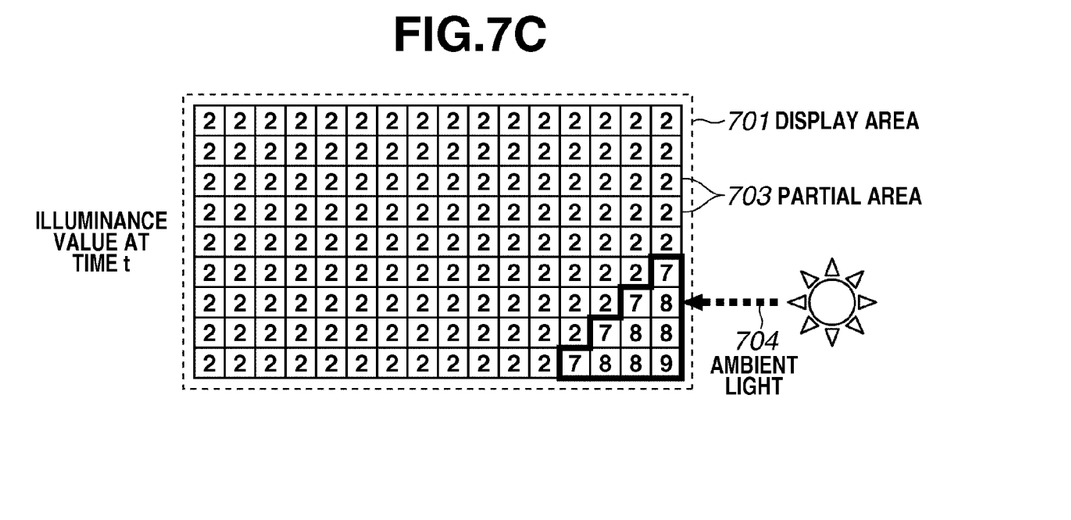

FIGS. 7A to 7D schematically illustrate processing for determining a value based on the time change in illuminance value. FIG. 7A illustrates an illuminance value (illuminance value a at this time) of the partial area measured at time (t−2) before the illuminance is measured two times. FIG. 7B illustrates an illuminance value (illuminance value b at this time) of the partial area measured at time (t−1) before the illuminance is measured one time. FIG. 7C illustrates an illuminance value (illuminance value c at this time) of the partial area measured at time t corresponding to the current time.

According to the present exemplary embodiment, with the following Expression 1, a value (change rate L) based on the time change in illuminance value of the partial area is calculated.

$$L = W1*(|b-c|/c) + W2*(|a-c|/c) \quad \text{(Expression 1)}$$

Here, W1 and W2 are weighting coefficients.

Figure 7D:
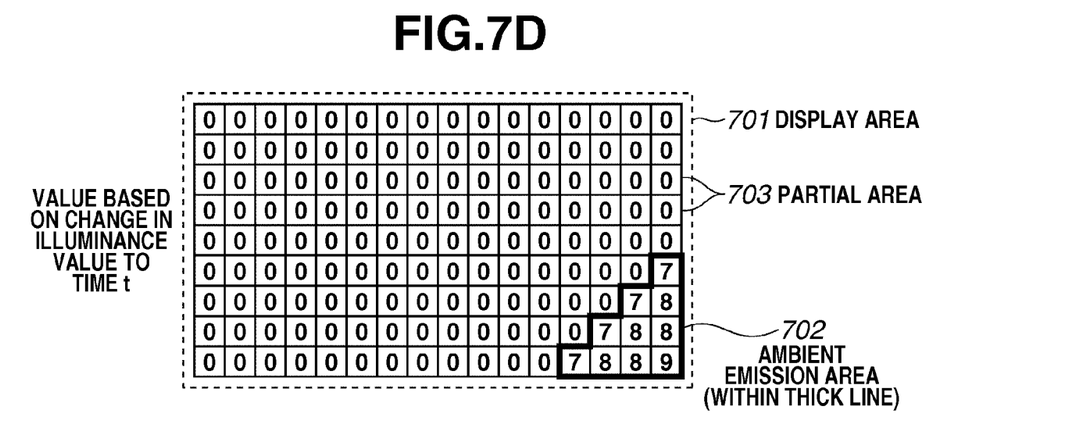

A partial area where the change rate L in illuminance value is a predetermined threshold value or more is an illuminance change area. FIG. 7D illustrates the change rate L in illuminance when W1 and W2 are 10. Further, when a threshold for determination is 4, in step S304, the determination unit 102 observes that an area 702 corresponding to the lower right portion of the display area 701 has a rate of illuminance change that is the threshold value or more. By performing the processing, the video image is displayed while avoiding an area where ambient light may enter or may not enter the display area, thereby improving the visibility.

According to the first and second exemplary embodiments, the area for displaying the video image is changed depending on the illuminance level. According to the present exemplary embodiment, the video layout is changed depending on the illuminance level without changing the display area of the video image.

The information processing apparatus according to the fourth exemplary embodiment is similar to the information processing apparatus 100, and a description thereof is thus omitted. The display position setting unit 104 sets not only the video display position but also the position of a user interface (UI) or subtitle that is superimposed on the video image. According to the present exemplary embodiment, the display position setting unit 104 determines the display position according to the priority of the video image or the UI or subtitle superimposed on the video image. The priorities may be added to the video data stored in advance in the video image storage unit 153, or the priority may be added to the video image in the video input unit 103 based on the operation of the user input from a user interface (not shown) of the information processing apparatus 100.

Figure 9A:
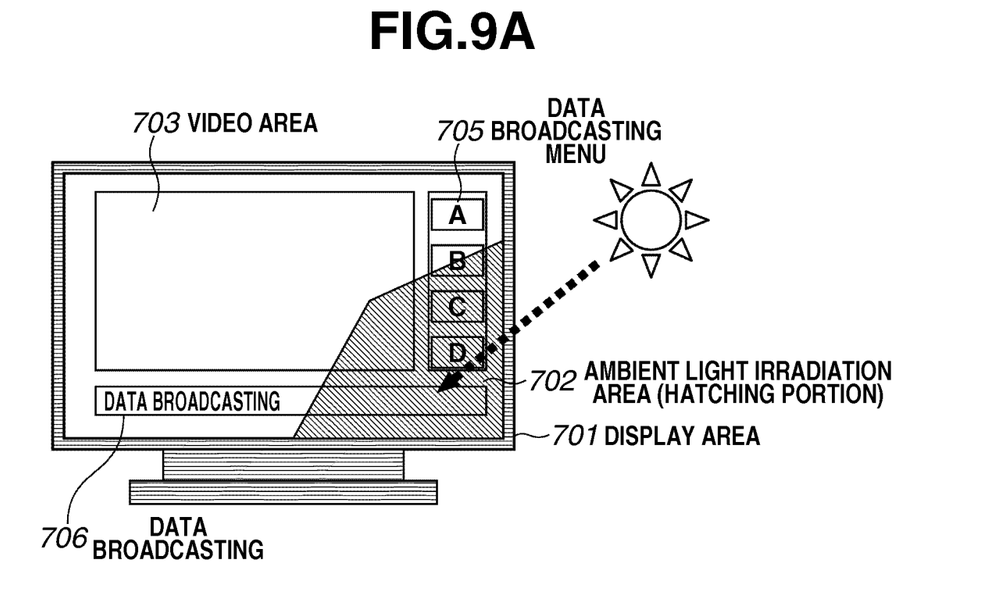
FIGS. 9A and 9B schematically illustrate change of the layout.
Figure 9B:
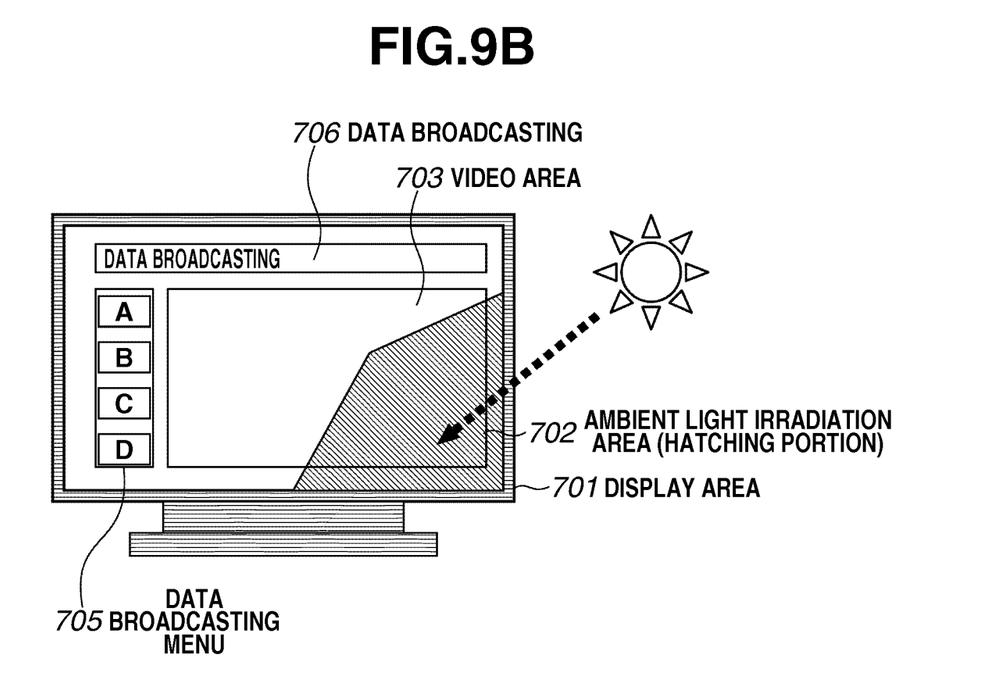

FIGS. 9A and 9B schematically illustrate change of the video layout based on the measured illuminance value. FIG. 9A illustrates data broadcasting that is displayed. The display area 701 displays a menu 705 of the data broadcasting and data broadcasting 706 as well as the video area 703 for displaying a video image of broadcasting. A part of the display area 701 includes the ambient light irradiation area 702 to which the ambient light is emitted. According to the present exemplary embodiment, the priority is determined with respect to the video image by the user operation as follows. The user requests the data broadcasting display to the information processing apparatus 100 via a user interface. When the user requests the data broadcasting display, the possibility that the user desires to view the data broadcasting is high and the display priority of the data broadcasting is therefore set to be high.

Figure 8:
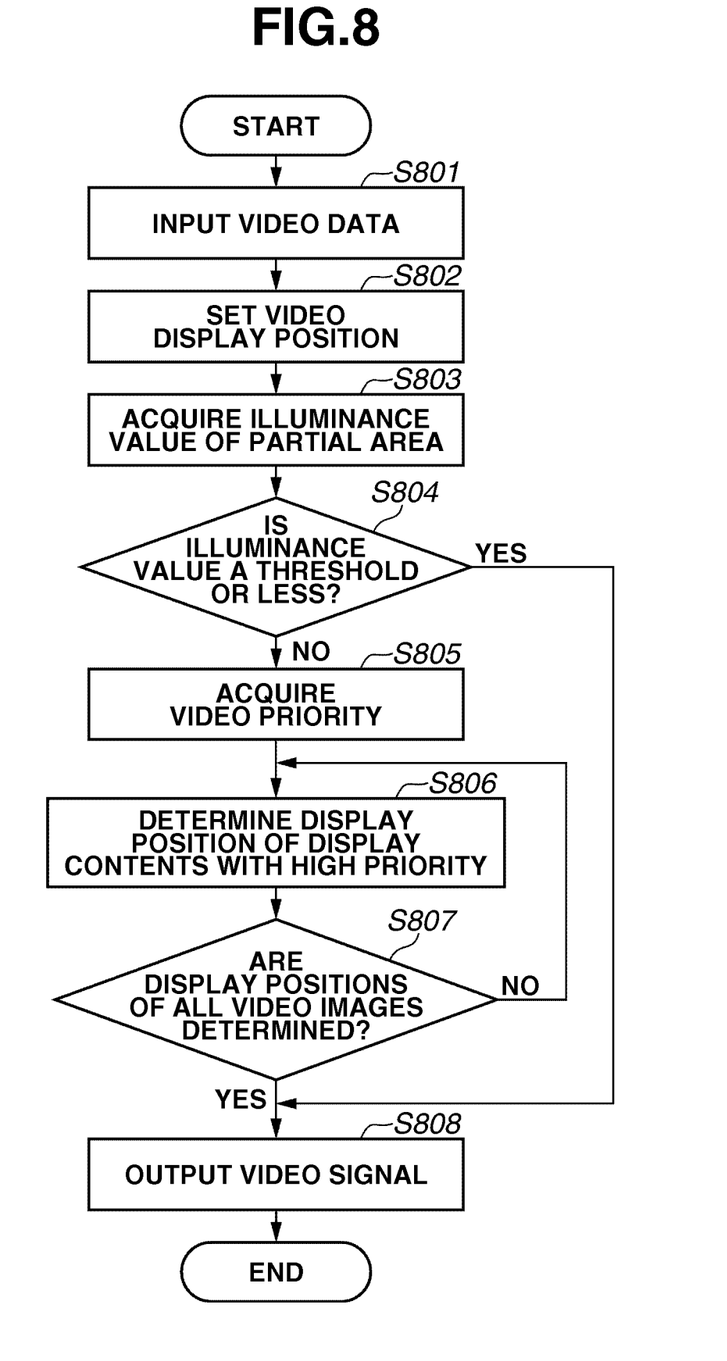
FIG. 8 illustrates a flowchart of example processing for setting the video display position.

Since the display priority of the data broadcasting is set to be high, the video input unit 103 sets values of the priority of the data broadcasting 706, the menu 705 of the data broadcasting, and the video area 703 to 1 to 3, respectively, thereby adding the priorities. The lower the value of the priority, the higher the priority. FIG. 8 illustrates a flowchart of example processing for setting the video display position in the information processing apparatus 110. The processing in steps S801 to S804 is similar to the processing in steps S301 to step S304. The processing in steps S808 to S809 is similar to the processing in steps S306 to S307. Based on these, only the different points are described.

In step S805, the display position setting unit 104 acquires the priority added to the video image in the video input unit 103 based on the user operation. As described above, the video area 703 includes three display contents of the video area 703, the menu 705 of the data broadcasting, and the data broadcasting 706. In step S805, the display position setting unit 104 acquires three priorities of the input video images. The values of the priority of the data broadcasting 706, the menu 705 of the data broadcasting, and the video area 703 are 1, 2, and 3, respectively, and the display position setting unit 104 determines that the priority order is the data broadcasting 706, the menu 705 of the data broadcasting, and the video area 703.

In step S806, the display position setting unit 104 determines the display position of the display contents with high priority. A video image with the highest priority is the data broadcasting 706, and the display position of the data broadcasting 706 is therefore determined. According to a determination method of the display position of the display position setting unit 104, an area showing an illuminance value of the threshold value or less and a low coordinate value is assigned as the display area. The data broadcasting 706 is assigned to the lowest coordinate value (0,0) outside the ambient light irradiation area.

In step S807, the display position setting unit 104 determines whether or not all the display positions are determined. Since the assignment of the display areas of the menu 705 of the data broadcasting and the video area 703 does not end, the processing proceeds to step S806. In step S806, the display position setting unit 104 next determines the display position of the menu 705 of the data broadcasting with high priority. An area adjacent to the data broadcasting 706 with the lowest coordinate value outside the ambient light irradiation area is assigned to the data broadcasting 706.

Steps S806 and S807 are repeated. After determining the positions of all display contents, the processing proceeds to step S808, and the video output unit 105 displays the video signal. Then, the display area 701 is displayed as illustrated in FIG. 9B. By performing the processing, when the user requests display of the data broadcasting, the data broadcasting is laid out outside the ambient light irradiation area so that the user can easily view contents of the data broadcasting. The layout of display contents is changed as mentioned above, thereby displaying the display contents with high importance outside the ambient light irradiation area and improving the visibility.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-278958 filed Dec. 8, 2009 and No. 2010-227549 filed Oct. 7, 2010 which are hereby incorporated by reference herein in their entirety.

What is claimed is:

1. An information processing apparatus comprising:
a measurement unit configured to measure illuminance of each of a plurality of partial areas which are obtained by dividing a screen of a display unit; and
a setting unit configured to set a position on the screen of the display unit to be used for displaying a video to an area except for a partial area where the illuminance is more than a reference value.

2. The information processing apparatus according to claim 1, wherein the setting unit sets a size of the video to a size at which the entire video is displayed on the display unit.

3. A control method comprising:
measuring illuminance of each of a plurality of partial areas which are obtained by dividing a screen of a display unit; and
setting a position on the screen of the display unit to be used for displaying a video to an area except for a partial area where the illuminance is more than a reference value.

4. A non-transitory computer readable storage medium storing a computer program enabling an information processing apparatus to perform the method according to claim 3 by having the information processing apparatus read and execute the computer program.

5. The information processing apparatus according to claim 2,
wherein the setting unit reduces the size of the video to a size at which the entire video is displayed on the area except for a partial area where the illuminance is more than a reference value.

6. The information processing apparatus according to claim 1,
wherein the setting unit is a unit configured to change a position to display the video to a set position,
wherein the set position is a position which is included in an area except for a partial area where the luminance is more than a reference value and at which a movement amount from a position to display the video before changing is a minimum.

7. The information processing apparatus according to claim 1, wherein the measurement unit measures illuminance of the plurality of partial areas using a plurality of illuminometers.

8. The information processing apparatus according to claim 1, wherein the measurement unit obtains illuminance of the partial area using a luminance meter for measuring luminance of the partial area.

9. The information processing apparatus according to claim 1, further comprising a detection unit configured to detect luminance of light emitted from the plurality of partial areas by the display unit,
wherein the setting unit sets a position to display the video to an area except for a partial area where illuminance measured by the measurement unit is more than a reference value and an area where the luminance detected by the detection unit is less than a predetermined threshold value.

10. An information processing apparatus capable of setting a position of a video to be displayed on a display unit, the information processing apparatus comprising:
a measurement unit configured to measure a change rate of illuminance in a plurality of partial areas which are obtained by dividing a screen of the display unit; and
a setting unit configured to set a position on the screen of the display unit to be used for displaying the video to an area except for a partial area where the change rate of the illuminance is more than a predetermined threshold value.

11. The information processing apparatus according to claim 10, wherein the measurement unit calculates the change rate of the illuminance based on illuminance of the plurality of partial areas at a first time and illuminance of the plurality of partial areas at a second time.

12. An information processing apparatus capable of setting a position of a plurality of videos to be displayed on a display unit, the information processing apparatus comprising:
an obtaining unit configured to obtain a priority order of the plurality of videos input by a user operation;
a measurement unit configured to measure illuminance of a plurality of partial areas which are obtained by dividing a screen of the display unit; and
a setting unit configured to set a layout on the screen of the display unit to be used for displaying the plurality of videos in an area except for a partial area where the illuminance is more than a predetermined threshold value based on the priority order of the plurality of videos.

13. The information processing apparatus according to claim 12, wherein the setting unit sets a position to display a video with a higher priority in the priority order of the plurality of videos obtained by the obtaining unit at a position more distant from a partial area where the illuminance is more than a reference value than a position to display a video with a lower priority.

14. The information processing apparatus according to claim 12, wherein the plurality of videos includes at least either of a video and a user interface or a subtitle to be superimposed on the video.

* * * * *